(12) United States Patent
Cuvillier et al.

(10) Patent No.: US 12,208,687 B2
(45) Date of Patent: Jan. 28, 2025

(54) DISPLAY DEVICE FOR VEHICLE

(71) Applicant: FAURECIA INTERIEUR INDUSTRIE, Nanterre (FR)

(72) Inventors: Christophe Cuvillier, Saint Ouen l'Aumône (FR); Armand Brousselle, Paris (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 17/853,438

(22) Filed: Jun. 29, 2022

(65) Prior Publication Data

US 2022/0410712 A1 Dec. 29, 2022

(30) Foreign Application Priority Data

Jun. 29, 2021 (FR) .................. FR 21 06980

(51) Int. Cl.
*B60K 35/00* (2024.01)
*F21V 8/00* (2006.01)
*G02F 1/13357* (2006.01)

(52) U.S. Cl.
CPC ............ *B60K 35/00* (2013.01); *G02B 6/0083* (2013.01); *G02F 1/133615* (2013.01); *B60K 2360/336* (2024.01)

(58) Field of Classification Search
CPC ...... G02F 1/133615; B60K 2370/1523; B60K 2370/343; B60K 35/00; B60K 37/00; B60K 2370/154; B60K 2370/1534; G09F 13/04; G09F 13/044; B60Y 2200/11; G01D 7/002
See application file for complete search history.

(56) References Cited

U.S. PATENT DOCUMENTS

| | | | | |
|---|---|---|---|---|
| 2,922,076 A | * | 1/1960 | Asars | H05B 33/12 345/206 |
| 5,786,665 A | * | 7/1998 | Ohtsuki | G02B 6/0031 362/601 |
| 2004/0174774 A1 | * | 9/2004 | Tasaka | G04G 9/0082 368/84 |
| 2005/0139143 A1 | * | 6/2005 | Dinh | G01D 7/002 116/284 |

(Continued)

FOREIGN PATENT DOCUMENTS

| | | |
|---|---|---|
| DE | 3032988 A1 | 4/1982 |
| FR | 2936619 A1 | 4/2010 |
| FR | 2985076 A1 | 6/2013 |

(Continued)

OTHER PUBLICATIONS

Search English translation of JP 2011180266 A (Year: 2011).*
French Search Report corresponding to French Application No. FR2106980, dated Mar. 3, 2022, 9 pages.

*Primary Examiner* — Omar Rojas Cadima
(74) *Attorney, Agent, or Firm* — Reising Ethington P.C.

(57) ABSTRACT

A display device for a vehicle includes: a first transparent or translucent layer comprising a pictogram, a second transparent or translucent layer, covering the pictogram, a liquid crystal display, arranged in line with the pictogram, and a light source configured to emit light to illuminate the pictogram by passing through the liquid crystal display and the second layer. The liquid crystal display at least partially covers the second layer, and an assembly formed by the first layer and the second layer is rigid.

18 Claims, 6 Drawing Sheets

(56) References Cited

U.S. PATENT DOCUMENTS

2011/0164396 A1* 7/2011 Obata .................. G01D 13/265
362/23.21
2018/0339647 A1* 11/2018 Fujita ....................... B60Q 3/14

FOREIGN PATENT DOCUMENTS

| FR | 3111857 A1 | | 12/2021 |
|---|---|---|---|
| JP | 2011180266 A | * | 9/2011 |

* cited by examiner

DISPLAY DEVICE FOR VEHICLE

TECHNICAL FIELD

This invention relates to a display device for a vehicle, in particular for a motor vehicle.

BACKGROUND

It is well known to equip certain interior equipment of a motor vehicle with display devices. Such a display device allows providing the occupants of the vehicle with information about equipment operation. For example, a display can indicate activation of the vehicle's parking brake, or the selected mode of operation for the vehicle's climate control system, or the locked or unlocked state of a door.

Some displays include a flexible film on which a pictogram is drawn, and also include a light source such as a light-emitting diode which can illuminate the pictogram to make it visible to the user of the vehicle. The light source may therefore be embedded in a layer of transparent or translucent material which is deposited on the film. The flexible film is reinforced by a rigid structure. This configuration provides great freedom in the shape that can be given to the display device, which can therefore hug the contours of complex surfaces.

However, with this configuration the minimum size of the illuminated areas remains relatively large, which means that it is not possible to illuminate fine details on demand. The view offered by this type of display is too coarse for certain applications.

One object of this invention is thus to provide a display device with improved resolution, making it possible to display fine details on demand, such as alphanumeric characters for example.

SUMMARY

To this end, the invention relates to a display device for a vehicle, comprising:
  a first transparent or translucent layer comprising a pictogram,
  a second transparent or translucent layer, covering the pictogram,
  a liquid crystal display, arranged in line with the pictogram,
  a light source configured to emit light to illuminate the pictogram by passing through the liquid crystal display and the second layer,
  wherein the liquid crystal display at least partially covers the second layer,
  and wherein an assembly formed by the first layer and second layer is rigid.

The liquid crystal display has a set of areas that can be selectively controlled to allow or prevent the passage of light, called pixels. Very small passages for light can thus be formed. Various areas of the second layer, or of the pictogram to be illuminated, can thus be illuminated in a differentiated manner. It is thus possible to represent finer details than in the solutions proposed by the prior art. In addition, the subassembly formed by the first layer, the second layer, and the liquid crystal display can easily be manufactured and is easily manipulated during manufacture of the display device. In addition, this configuration makes it possible to protect the liquid crystal display from manipulations by vehicle occupants. Indeed, the forces generated by an occupant when pressing on a pictogram are transmitted to the first layer which is flexible, and can deform it locally. These forces and deformations are not transmitted to the liquid crystal display, since a rigid layer is interposed between the first layer and the display. The second layer thus allows improving the reliability of the display device.

The features listed in the following paragraphs may be implemented independently of each other or in any technically possible combination:
  The first layer is integral with the second layer.
  The first layer is flexible. The second layer is rigid.
  The light source is arranged on a layer of material, and the light source is electrically powered by an electrically conductive track arranged on the layer of material.
  The light source is arranged on the first layer.
  The light source is electrically powered by an electrically conductive track arranged on the first layer.
  The light source is arranged on a third layer.
  The third layer is flexible.
  The light source is electrically powered by an electrically conductive track arranged on the flexible third layer.
  The light source is embedded in a layer of translucent or transparent material.
  The light source is embedded in a rigid layer.
  The layer embedding the light source comprises a light-emitting surface, the light-emitting surface forming an angle greater than 70° with the liquid crystal display.
  The layer of transparent or translucent material in which the light source is embedded is arranged on the layer on which the light source is arranged.
  The liquid crystal display is arranged between the second layer and the third layer.
  The third layer is formed of the same material as the first layer.
  The light source is embedded in a fourth layer arranged on the third layer. The fourth layer is transparent or translucent. The subassembly comprising the third layer, the fourth layer, and the light source thus forms a module ensuring the lighting of the pictogram.
  The fourth layer is rigid.
  The fourth layer is formed of the same material as the second layer.
  The fourth layer is arranged in line with the liquid crystal display.
  The liquid crystal display is arranged between the fourth layer and the second layer.
  According to one embodiment, a surface of the fourth layer facing the liquid crystal display is at a distance from the liquid crystal display.
  Alternatively, a surface of the fourth layer facing the liquid crystal display is in contact with the liquid crystal display.
  The light source is arranged on a rigid third layer, the third layer comprises a printed circuit board, and the light source is arranged next to a light guide arranged on the third layer.
  The light source is electrically powered by an electrically conductive track arranged on the third layer.
  According to one embodiment, the first layer is configured to supply electric power to the liquid crystal display.
  Alternatively, the third layer is configured to supply electric power to the liquid crystal display.
  In another alternative, the liquid crystal display is connected to a power supply by an electrical connection traversing the third layer.
  The electrical connection also traverses the fourth layer.
  The invention also relates to a method for producing a display device as described above, comprising the steps of:
  providing a first transparent or translucent layer, forming a pictogram on a surface of the first layer,
injecting onto the first layer a second transparent or translucent layer covering the pictogram, an assembly formed by the first layer and second layer being rigid,
placing a liquid crystal display on the second layer, arranged in line with the pictogram so as to form a first subassembly.

According to an exemplary implementation of this method, the first transparent or translucent layer may be flexible. The second layer may be rigid.

The method may also include the steps of:
providing a third layer,
fixing a light source on the third layer,
embedding the light source with a fourth layer forming a light guide, so as to form a second subassembly,
injecting onto the first layer of the first subassembly a support configured to retain the first layer and the second layer.

According to this method, the third layer may be transparent or translucent. The third layer may also be flexible. The fourth layer forming a light guide may be rigid.

The method may also include the step of:
securing together the second subassembly and the support, the light guide being configured to illuminate the pictogram.

BRIEF DESCRIPTION OF DRAWINGS

Other features, details, and advantages will become apparent upon reading the detailed description below, and upon analyzing the appended drawings, in which.

DETAILED DESCRIPTION

To facilitate reading the figures, the various elements are not necessarily shown to scale. In these figures, identical elements bear the same references. Certain elements or parameters may be indexed, i.e. designated for example as first element or second element, or as first parameter and second parameter, etc. The purpose of this indexing is to differentiate between elements or parameters that are similar but not identical. This indexing does not imply a priority of one element or parameter over another, and the names can be interchanged.

Figure 1:
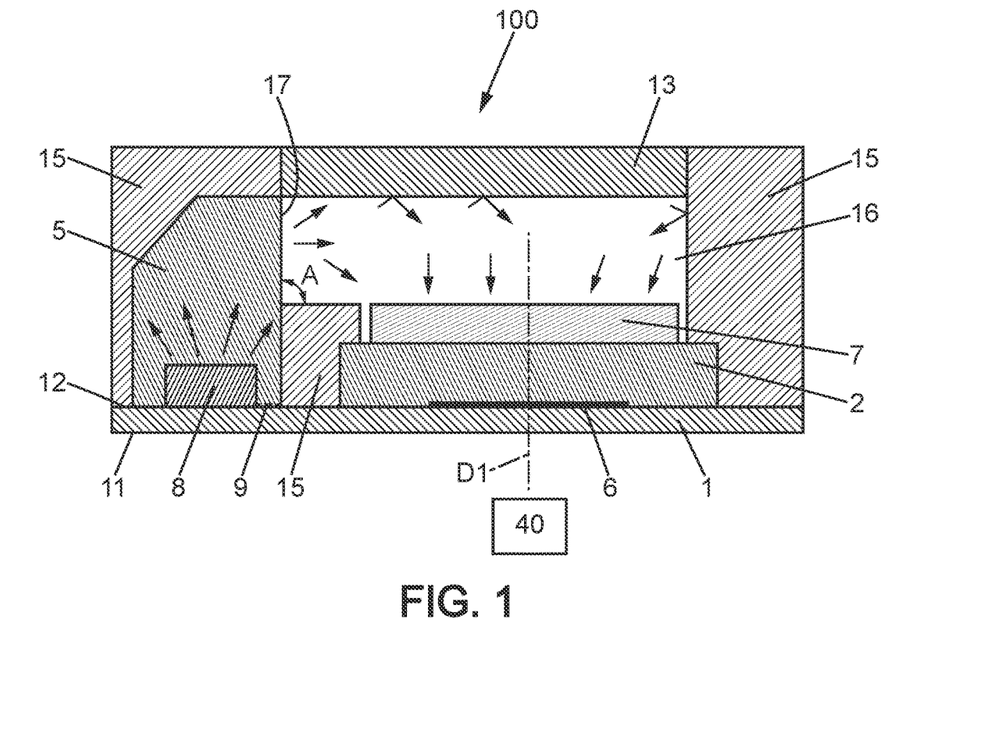
FIG. 1 is a schematic partial side view of a display device according to a first embodiment of the invention.

FIG. 1 schematically illustrates a display device 100 for a vehicle, in a side section view. The display device 100 is intended to be installed in the passenger compartment of the vehicle, for example on the dashboard of the vehicle, on the center console which groups controls for various equipment of the vehicle or on a door panel of the vehicle.

The vehicle display device 100 comprises:
a first transparent or translucent layer 1 comprising a pictogram 6,
a second transparent or translucent layer 2, covering the pictogram 6,
a liquid crystal display 7, arranged in line with the pictogram 6,
a light source 8 configured to emit light so as to illuminate the pictogram 6 by traversing the liquid crystal display 7 and the second layer 2,
wherein the liquid crystal display 7 at least partially covers the second layer 2,
and wherein an assembly formed by the first layer 1 and second layer 2 is rigid.

The liquid crystal display 7 comprises a set of areas which can be selectively controlled to allow or prohibit the passage of light, called pixels. Very small passages for light can thus be formed. The light emitted by the light source 8 passes through the areas of the liquid crystal display which allow light to pass through, then passes through the second layer 2, then passes through the first layer 1, which makes it possible to illuminate the pictogram for the user 40. By controlling the various pixels appropriately, various areas of the second layer 2, or of the pictogram 6, can thus be illuminated in a differentiated manner. It is thus possible to represent finer details than in the solutions proposed by the prior art. Moreover, the subassembly formed by the first layer 1, the second layer 2, and the liquid crystal display 7 can easily be manufactured. This subassembly is easy to manipulate during manufacture of the display device 100, because it has sufficient mechanical strength. Indeed, the second layer 2 reinforces the first layer 1, which prevents it from tearing, for example. The first layer 1 is integral with the second layer 2. The first layer 1 and the second layer 2 form a subassembly. The first layer 1 is flexible. The second layer 2 is for example rigid. In the subassembly, or assembly, formed by the first layer 1 and second layer 2, one or more layers of decorative or electrically conductive inks may be inserted between the first layer 1 and second layer 2.

The first layer 1, the second layer 2, and the liquid crystal display 7 are superimposed in that order. This configuration, in which the second layer 2 is interposed between the first layer 1 and the liquid crystal display 7, allows protecting the liquid crystal display 7 from the manipulations of the vehicle occupants. Indeed, the forces generated by an occupant when pressing on the first layer 1, which is flexible, can deform it locally. These forces and deformations are not transmitted to the liquid crystal display 7, since a rigid layer 2 is inserted between the first layer 1 and the display 7. The second layer 2 thus makes it possible to improve the reliability of the display device.

The fact that the first layer 1 is flexible is understood to mean that it is made of a material and of dimensions such that the first layer 1, taken in isolation, can deform under its own weight when placed on two supports arranged at its furthest ends. Similarly, the fact that the second layer 2 is rigid is understood to mean that this second layer 2 is made of a material and of dimensions such that this second layer 2, taken in isolation, does not deform under the effect of mechanical stresses applied under normal conditions of use. In particular, the subassembly formed by stacking the second layer 2 and first layer 1 does not present any perceptible deformation when a force of 5 Newtons is applied to the first layer 1, perpendicular to the second layer 2. In other words, the assembly formed by the first layer 1 and second layer 2 is rigid. The Young's modulus of the first layer 1 is between 2000 MPa and 3500 MPa (megapascal). The Young's modulus of the translucent second layer 2 is between 2000 MPa and 3500 MPa.

The fact that the liquid crystal display 7 is arranged in line with the pictogram 6 is understood to mean that the pictogram 6 is facing the display 7. In other words, a straight line D1 passing through the pictogram 6 and perpendicular to the plane of the pictogram 6 passes through the display 7. An intermediate layer may be inserted between the display 7 and the pictogram 6. This is the case in the example illustrated, where, along line D1, the second layer 2 is arranged between the first layer 1 and the display 7. The display 7, the second layer 2, and the first layer 1 are stacked in that order. The pictogram 6, which can be illuminated by the light source 8, is visible to the user 40. According to one particular embodiment, the second layer 2 is in line with the pictogram 6, and extends beyond the pictogram 6 in each direction contained in the plane of the pictogram. The distance by which the second layer 2 extends beyond the pictogram 6 is approximately 0.5 millimeters. In other words, the second layer 2 completely covers the surface of the pictogram 6 that is opposite the surface of the pictogram facing the first layer 1, and extends beyond the pictogram in all directions contained in the plane of the pictogram 6.

The fact that the first layer 1 and second layer 2 are translucent or transparent is understood to mean that the first layer and the second layer allow incident light to pass through. Thus: the pictogram 6 is clearly visible to the user 40, since the light emitted by the light source 8 reaches him/her after having traversed the first layer 1 and second layer 2 in particular. The level of light transmission is between 5% and 100%, and 100% corresponds to transparent. This transmission level corresponds to transmission through the assembly formed by the first layer 1 and second layer 2.

The first layer 1 of the display device 100 defines a surface visible to a user 40 when the display device 100 is installed in its normal position of use in the vehicle. A first surface 11 of the first layer 1 defines an outer surface of the display device 100.

The first layer 1 is preferably formed of a plastic film. The first layer 1 may for example be made of polycarbonate (PC), polyethylene terephthalate (PET), polycarbonate/polyethylene terephthalate copolymer (PC/PET). The thickness of the first layer 1 may be between 175 microns and 750 microns.

The second layer 2 is preferably formed of polycarbonate (PC) or polyethylene terephthalate (PET). The thickness of the second layer 2 may be between 500 microns and 3 millimeters. In particular, the thickness of the second layer 2 may be between 1 and 3 millimeters.

The light source 8 comprises a light-emitting diode, often referred to by the term LED. In the example illustrated, the light source 8 comprises a single light-emitting diode. It is possible to provide variants in which several light-emitting diodes are used. The light-emitting diodes may be arranged side by side or else spaced apart from each other. The light-emitting diodes may comprise a light-emitting surface arranged parallel to the flexible film 1 or arranged perpendicular to the flexible film 1.

The second layer 2 is arranged on the first layer 1. The liquid crystal display 7 is arranged on the second layer 2. The liquid crystal display 7 may for example be adhered to the second layer 2 using an optically transparent glue. In other words, the liquid crystal display 7 is in contact with the second layer 2. The second layer 2 is in contact with the first layer 1. The second layer 2 may for example be injected on the first layer 1. Injected is understood to mean that the second layer 2 is formed by injection of a molten molding material into a molding cavity, followed by solidification of the molding material when it cools.

The display device 100 comprises an opaque support 15, configured to support the first layer 1 and second layer 2. The opaque support 15 is rigid, and ensures mechanical retention of both the first layer 1 and second layer 2. The opaque support 15 may be formed by an injected plastic material.

The pictogram 6 here is printed on the first layer 1. The pictogram is thus defined by decorative inks, which demarcate the pictogram. The decorative inks may be of different colors. The decorative inks may be arranged on different portions of the first layer 1. A translucent ink may be applied in the areas where the light emitted by the light source must be able to pass through.

In the example shown, the pictogram is printed on the surface 12 of the layer 1 which faces towards the second layer 2. In other words, the pictogram 6 is formed on the first layer 1 and is in contact with the second layer 2.

According to a variant not shown, the pictogram 6 may be formed on the surface 11 of the first layer 1 that is opposite the surface 12 facing towards the second layer 2. In other words, the pictogram 6 is arranged on the surface of the first layer 1 which faces outward. Optionally, the pictogram 6 may be covered with a protective varnish to protect it from contact with the occupants of the vehicle.

The light source 8 is arranged on a layer of material, and the light source 8 is electrically powered by an electrically conductive track arranged on the layer of material. In the embodiment of FIG. 1, the light source 8 is arranged on the first layer 1. When several light-emitting diodes are used, each one is arranged on the first layer 1.

The light source 8 is electrically powered by an electrically conductive track 9 arranged on the first layer 1. The electrically conductive track 9 comprises an electrically conductive ink deposited on the flexible layer 1.

The light source 8 is arranged on the first layer 1. The light source 8 is embedded in a layer 5 of translucent or transparent material. Embedded is understood to mean that all the surfaces of the light source 8 capable of emitting light rays are covered by the embedding material. In other words, each surface of light source 8, except the one in contact with the first layer 1, is covered by the embedding medium, or material. The embedding medium can also be referred to as coating medium. The layer 5 of transparent or translucent material in which the light source 8 is embedded is arranged on the layer 1 on which the light source 8 is arranged.

The light source 8 is embedded in a rigid layer 5. The material forming the layer 5 is translucent or transparent so as to allow the light emitted by the light source 8 to pass through. The layer 5 is in contact with the first layer 1. The layer 5 embedding the light source 8 may be injected onto the first layer 1. The layer 5 embedding the light source 8 is in contact with the support 15. The opaque support 15 separates the layer 5 embedding the light source and the second layer 2.

The rigid layer 5 diffuses the light emitted by the light source 8. The interface between the layer 5 and the support 15, as well as the interface between the layer 5 and the first layer 1, allow reflections of the light rays emitted by the light source 8. The interface between the light source 8 and the first layer 1 is opaque, in order to prevent leakage of light rays towards the surface 11, through the thickness of the first layer 1.

The layer 5 embedding the light source 8 comprises a light-emitting surface 17. The light-emitting surface 17 forms an angle A with the liquid crystal display 7 that is greater than 70°.

In the example shown in FIG. 1, the light-emitting surface 17 is perpendicular to the liquid crystal display 7. The angle A is thus 90° in FIG. 1.

The support 15 also retains the layer 5 embedding the light source 8. The support 15, the layer 5, and the surface of the display 7 opposite its surface facing towards the second layer 2 define a cavity 16 in which the light emitted by the light source 8 propagates and is reflected. A cover 13 closes the cavity 16. The cover 13 is integral with the support 15. The cover 13 is opaque, so that the light emitted by the light source 8 can only leave the cavity 16 by passing through the display 7, the second layer 2, and the first layer 1. The arrows in FIG. 1 schematically show the path of the light rays emitted by the light source 8. The cover 13 is turned towards the side opposite to the visible surface of the display device 100. The cover 13 is thus oriented towards the equipment of the vehicle on which the display device is installed, such as a dashboard. The cover 13 and the first layer 1 extend here in parallel planes.

The surfaces which contribute to reflecting the light rays may have a reflective coating. Thus, the walls of the support 15 defining the cavity 16 may have a reflective coating. Similarly, the surface of the cover 13 facing towards the cavity 16 may have a reflective coating. Preferably, the light reflectance obtained is greater than 80%.

Figure 2:
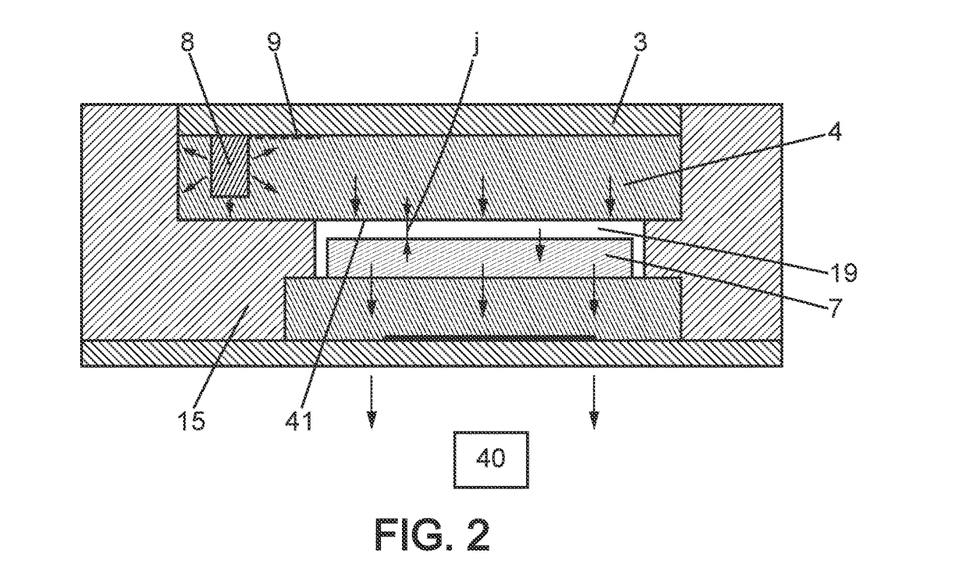
FIG. 2 is a schematic partial side view of a display device according to a second embodiment of the invention.
Figure 3:
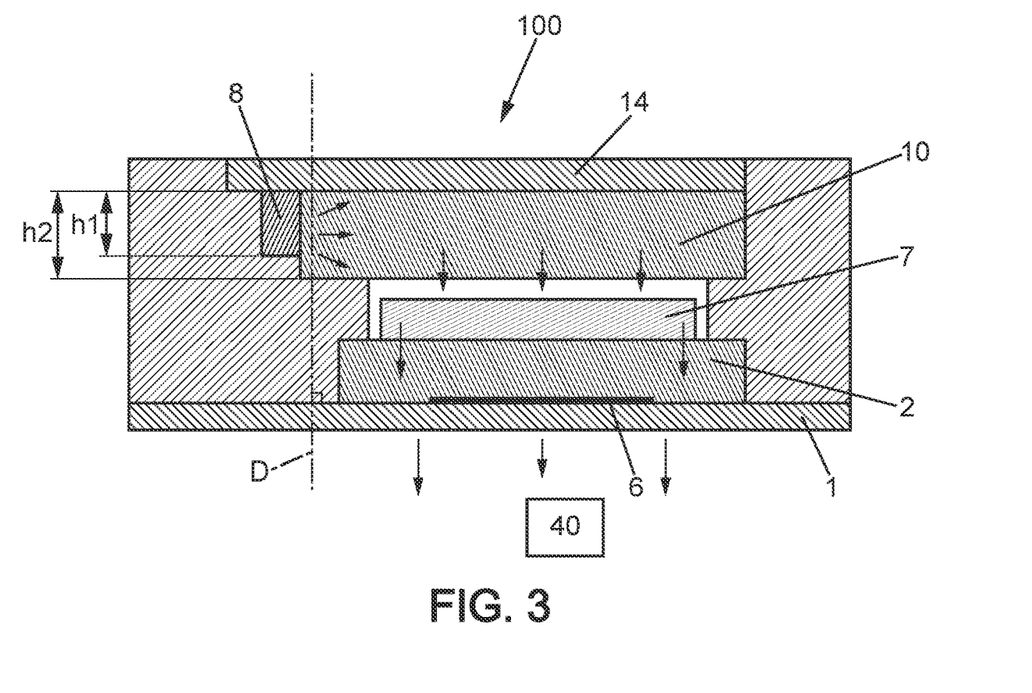
FIG. 3 is a schematic partial side view of a display device according to a third embodiment of the invention.

FIGS. 2 and 3 respectively illustrate a second embodiment and a third embodiment of the display device 100.

These embodiments differ from the first embodiment in particular by the location of the light source 8. The display device 100 here comprises a third layer 3 on which the light source 8 is arranged. The liquid crystal display 7 is arranged between the second layer 2 and the third layer 3.

The third layer 3 is distinct from the second layer 2 and is distinct from the first layer 1. The second layer 2 is distinct from the first layer 1.

In the embodiment of FIG. 2, the light source 8 is arranged on a third layer 3. The third layer 3 here is flexible.

The third layer 3 here is formed of the same material as the first layer 1. It is also possible to use a material different from the material of the first layer 1. As with the first layer 1, the third layer 3 may be for example of polycarbonate (PC), polyethylene terephthalate (PET), or polycarbonate/polyethylene terephthalate copolymer (PC/PET). The thickness of the third layer 3 may be between 175 microns and 750 microns.

In this second embodiment, illustrated in FIG. 2, the third layer 3 plays a role similar to that of the cover 13 of the first embodiment, illustrated in FIG. 1.

In the second embodiment, illustrated in FIG. 2, the light source 8 is embedded in a fourth layer 4 arranged on the third layer 3. The fourth layer 4 is transparent or translucent. The fourth layer 4 here is formed of the same material as the second layer 2. Different materials could also be used. In this embodiment, the fourth layer 4 is rigid. The layer 4 of transparent or translucent material in which the light source 8 is embedded is arranged on the layer 3 on which the light source 8 is arranged.

The light source 8 is electrically powered by an electrically conductive track 9 arranged on the third flexible layer 3.

The subassembly comprising the third layer 3, the fourth layer 4, and the light source 8 thus forms a module which ensures the lighting of the pictogram 6. Assembly of the display device 100 is facilitated.

The fourth layer 4 is arranged in line with the liquid crystal display 7. The light diffused by the fourth layer 4 can thus illuminate the liquid crystal display 7 then illuminate the pictogram 6. The liquid crystal display 7 is arranged between the fourth layer 4 and the second layer 2.

In the example of FIG. 2, a surface 41 of the fourth layer 4 facing towards the liquid crystal display 7 is at a distance from the liquid crystal display 7. In other words, free space 19 remains between the surface 41 and the liquid crystal display 7. The clearance between the surface 41 and the display 7 is schematically represented by the arrow designated by the label j. Thus, the layer 4 of light-diffusing material does not apply mechanical stresses to the liquid crystal display 7, and therefore does not risk damaging it.

According to a variant not shown, a surface 41 of the fourth layer 4 facing towards the liquid crystal display 7 is in contact with the liquid crystal display 7. In other words, there is then no clearance between the layer 4 diffusing light from the light source 8 and the liquid crystal display 7. The size of the display device 100, in a direction D normal to the first layer 1, can thus be reduced, which facilitates integration of the display device into the vehicle.

A third embodiment is represented in FIG. 3. In this embodiment, the light source 8 is arranged on a third rigid layer 3. The third layer 3 comprises a printed circuit board 14 and the light source 8 is arranged next to a light guide 10 arranged on the third layer 3. In other words, the light source 8 is adjacent to the light guide 10 on the surface of the printed circuit board 14. The thickness of the light guide 10, schematically represented by the distance h2, is greater than the thickness of the light source 8, schematically represented by the distance h1.

In other words, the third embodiment differs from the second embodiment in that the light source 8 is not embedded and the light guide 10 is received on a printed circuit board. The light guide 10 plays a role similar to the role of the fourth layer 4 in the second embodiment. The light guide 10 is for example a part molded independently of the other parts of the device, and attached to the printed circuit board.

The light source 8 is electrically powered by an electrically conductive track 9 formed on the printed circuit board 14.

Figure 4:
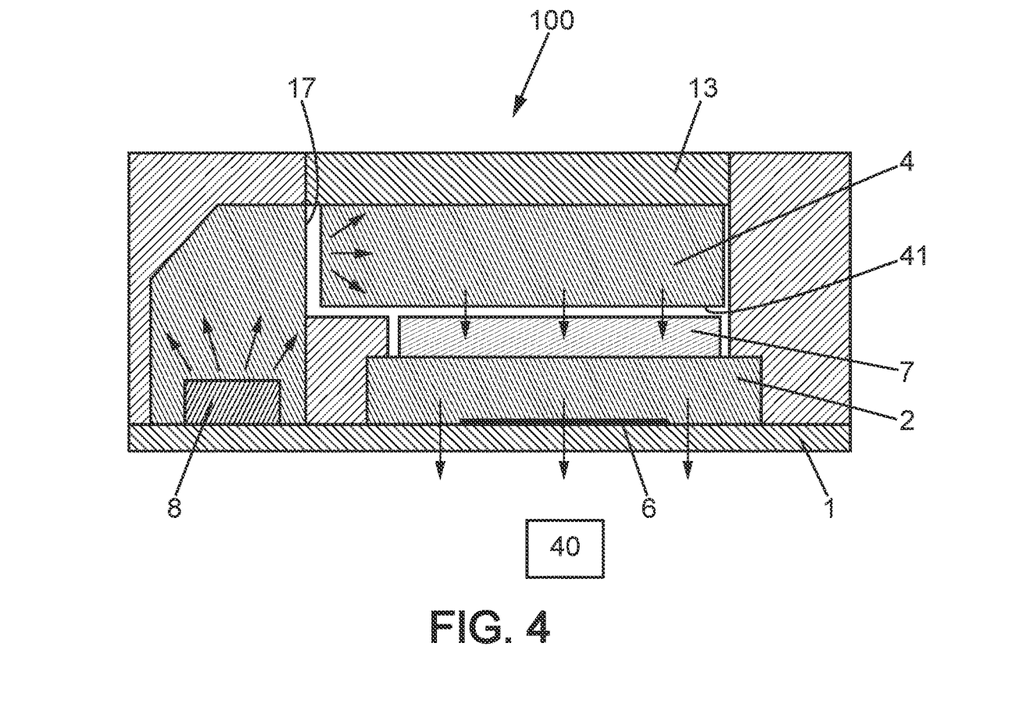
FIG. 4 is a schematic partial side view of a variant of the display device of FIG. 1.

FIG. 4 illustrates a variant of the embodiment of FIG. 1.

In this variant, a fourth layer 4 of transparent material is arranged on the third layer 3, facing the surface 17 of the layer 5 embedding the light source 8. The light emitted by the light source 8 exits the layer 5 at the surface 17, and passes through the fourth layer 4 before passing through the display 7, the second layer 2, the pictogram 6, and the first layer 1. The fourth layer 4 improves homogeneity in the illumination of the pictogram 6 in comparison to the embodiment of FIG. 1. As with the embodiment of FIG. 1, the layer 5 of transparent or translucent material in which the light source 8 is embedded is arranged on the layer 1 on which the light source 8 is arranged.

The fourth layer 4 comprises a light-emitting surface 41, the light-emitting surface 41 forming an angle of less than 20° with the liquid crystal display 7.

The light-emitting surface 41 of the fourth layer 4 here is parallel to the liquid crystal display 7. The angle between the light-emitting surface 41 and the liquid crystal display 7 is therefore zero.

FIGS. 5 to 9 detail more particularly the manner in which the electrical connection of the liquid crystal display 7 is established.

Figure 5:
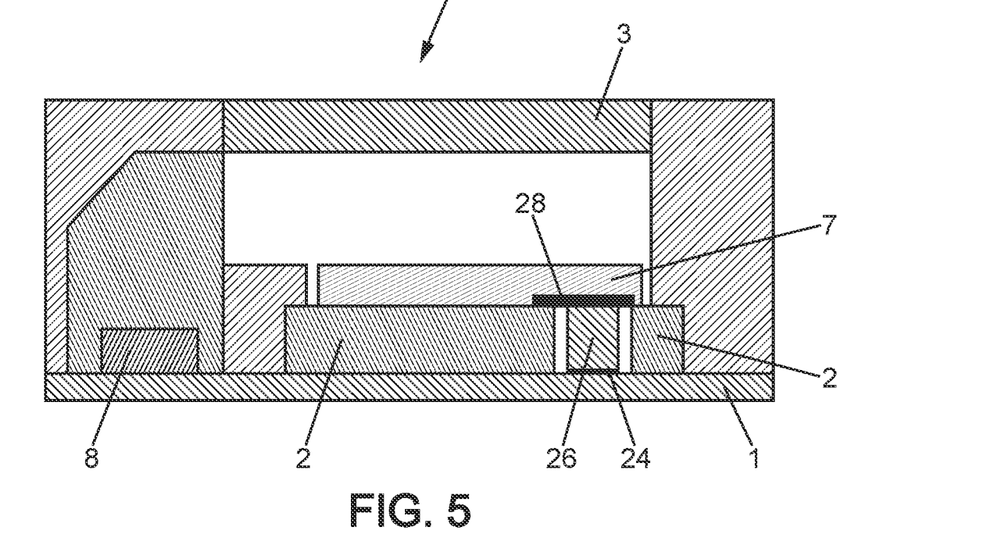
FIG. 5 is a schematic partial side view detailing a first variant of the display device of FIG. 1.
Figure 7:
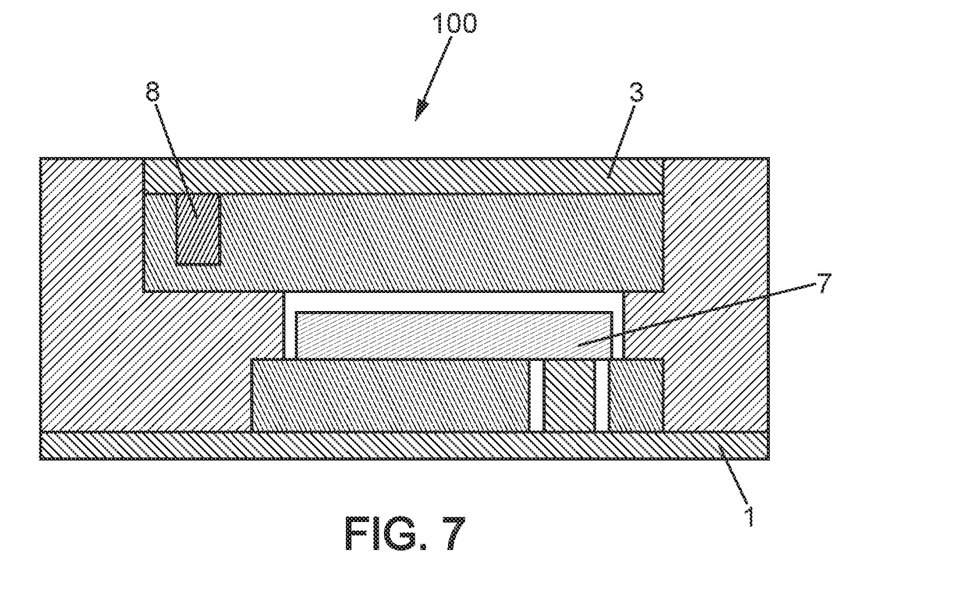
FIG. 7 is a schematic partial side view detailing a first variant of the display device of FIG. 2.

In the variants detailed in FIGS. 5 and 7, the first layer 1 is configured to supply electric power to the liquid crystal display 7. In the variant of FIG. 5, the same first layer 1 thus carries the tracks for electrically powering the light source 8 as well as those for the liquid crystal display 7. In the variant of FIG. 7, layer 1 supplies the electric power to the display 7 and the third layer 3 supplies the electric power to the light source 8.

Figure 8:
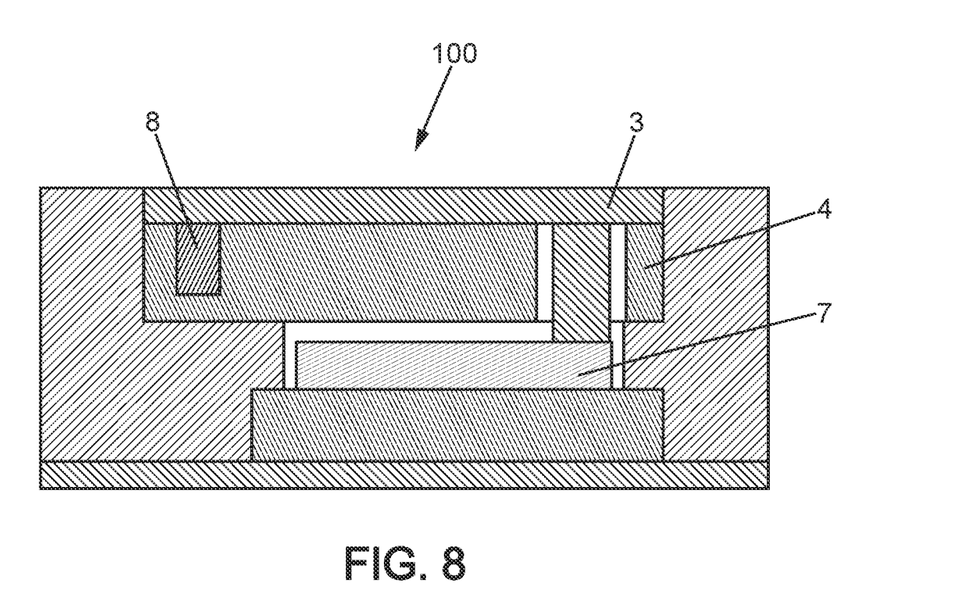
FIG. 8 is a schematic partial side view detailing a second variant of the display device of FIG. 2.

In the variant detailed in FIG. 8, the third layer 3 is configured to supply the electric power to the liquid crystal display 7. In this variant, the third layer 3 supplies the electric power to the light source 8 and to the display 7.

Figure 6:
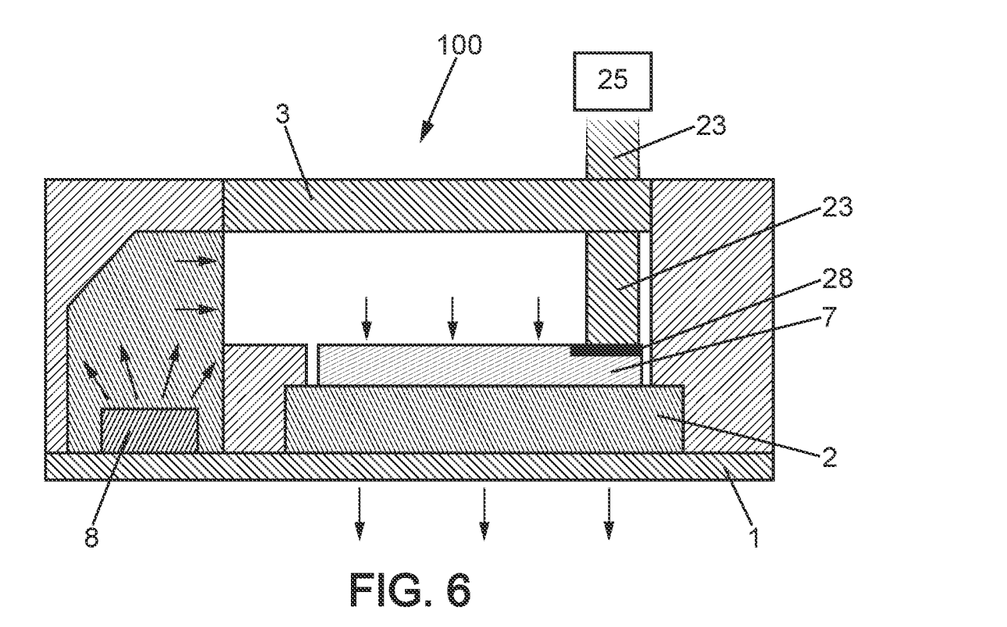
FIG. 6 is a schematic partial side view detailing a second variant of the display device of FIG. 1.
Figure 9:
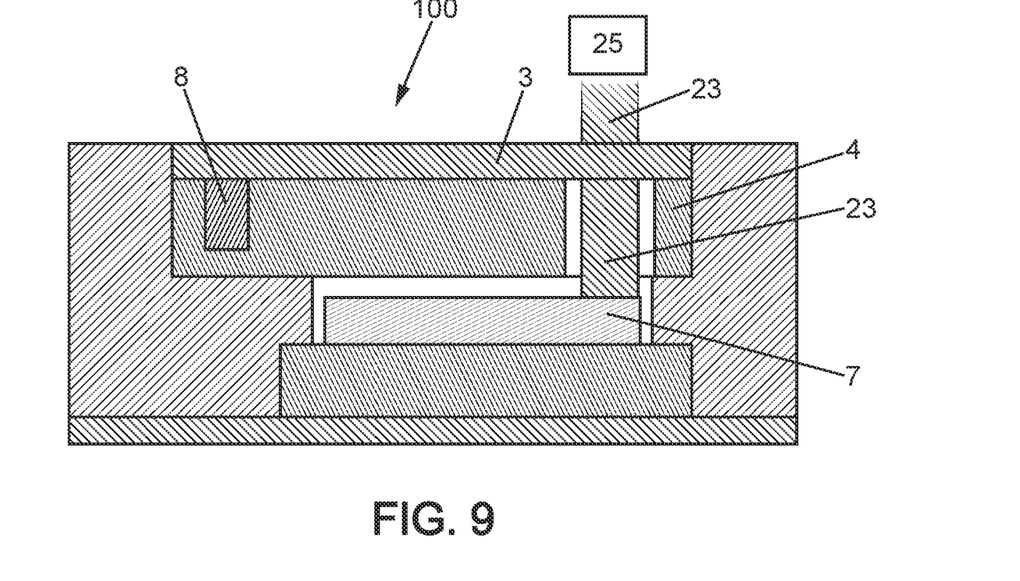
FIG. 9 is a schematic partial side view detailing a third variant of the display device of FIG. 2.

In the variants of FIGS. 6 and 9, the electric power to the liquid crystal display 7 is provided by a power supply 25 external to the module illuminating the pictogram 6.

In the variant of FIG. 5, the first layer 1 comprises an electrically conductive ink 24 configured to supply electric power to the liquid crystal display 7. The ink 24 deposited on the first layer 1 forms a track for electrically powering the liquid crystal display 7.

The liquid crystal display 7 is electrically connected to the electrically conductive ink 24 of the first layer 1 by an electrical connector 26. Electrical connector 26 is connected to a complementary connector 28 forming part of the liquid crystal display 7. Connector 26 ensures an electrical contact with the conductive ink 24 via connection tabs, not shown. Electrical connector 26 traverses the second layer 2.

In the variants of FIGS. 6 and 9, the liquid crystal display 7 is connected to a power supply 25 by an electrical connection 23 traversing the third layer 3. In the variant of FIG. 9 where a fourth layer 4 is arranged under the third layer 3, the electrical connection 23 also traverses the fourth layer 4. This traversal through the third layer 3 and fourth layer 4 is ensured in a manner that avoids any leakage of light to the outside, so that light emitted by the light source 8 is reflected and diffused towards the pictogram 6 and not towards the outside.

Figure 10:
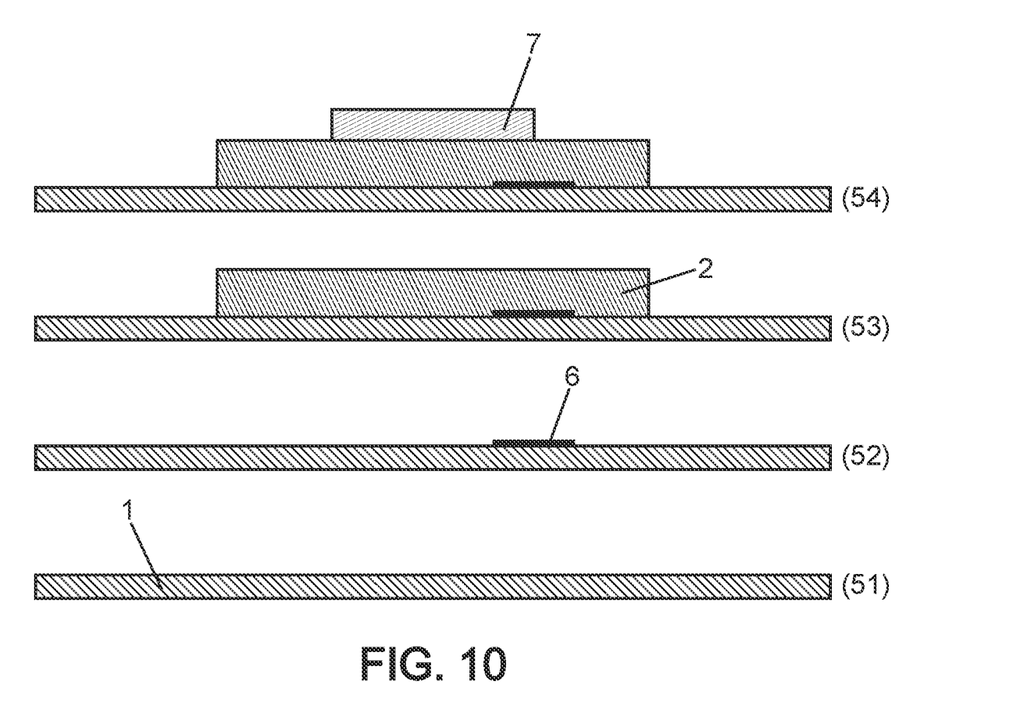
FIG. 10 is a schematic view illustrating different steps of the method according to an embodiment of the invention.

FIG. 10 schematically illustrates several steps of the method for manufacturing a display device as described above.

The method comprises the steps of:
providing a first transparent or translucent layer 1 (step 51),
forming a pictogram 6 on a surface 11, 12 of the first layer (step 52),
injecting onto the first layer 1 a second transparent or translucent layer 2 covering the pictogram 6, the assembly formed by the first layer 1 and second layer 2 being rigid (step 53),
placing a liquid crystal display 7 on the second layer 2, arranged in line with the pictogram 6 so as to form a first subassembly (step 54).

According to one particular implementation, the method comprises the steps of:
providing a first transparent or translucent layer 1, the first layer 1 being flexible (step 51),
forming a pictogram 6 on a surface 11, 12 of the first layer (step 52),
injecting onto the first layer 1 a second transparent or translucent layer 2 covering the pictogram 6, the second layer 2 being rigid (step 53),
placing a liquid crystal display 7 on the second layer 2, arranged in line with the pictogram 6 so as to form a first subassembly (step 54).

Figure 11:
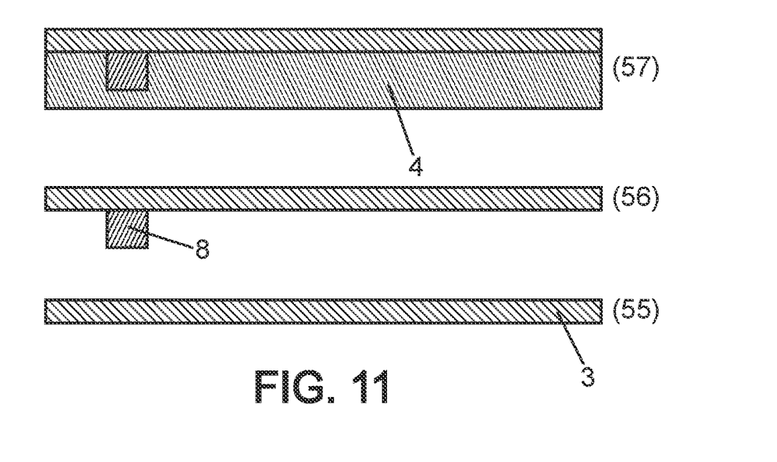
FIG. 11 is a schematic view illustrating other steps of the method according to an embodiment of the invention.

FIG. 11 schematically illustrates several other steps in the method for manufacturing a display device as described above.

The method also includes the steps of:
providing a third layer 3 (step 55),
fixing a light source 8 on the third layer 3 (step 56),
embedding the light source 8 with a fourth layer 4 forming a light guide 10, so as to form a second subassembly (step 57).

According to one particular implementation, the method comprises the steps of:
providing a third transparent or translucent layer 3, the third layer 3 being flexible (step 55),
fixing a light source 8 on the third transparent or translucent layer 3 (step 56),
embedding the light source 8 with a rigid layer 4 forming a light guide 10, so as to form a second subassembly (step 57).

Preferably, the step of embedding the light source 8 is carried out by injection molding a rigid layer 4. The injected material forming the rigid layer 4 embeds the light source 8, meaning it covers the exposed surfaces of the light source 8.

These steps allow forming a second subassembly comprising the light source, this subassembly making it possible to illuminate the pictogram of the first subassembly.

Figure 12:
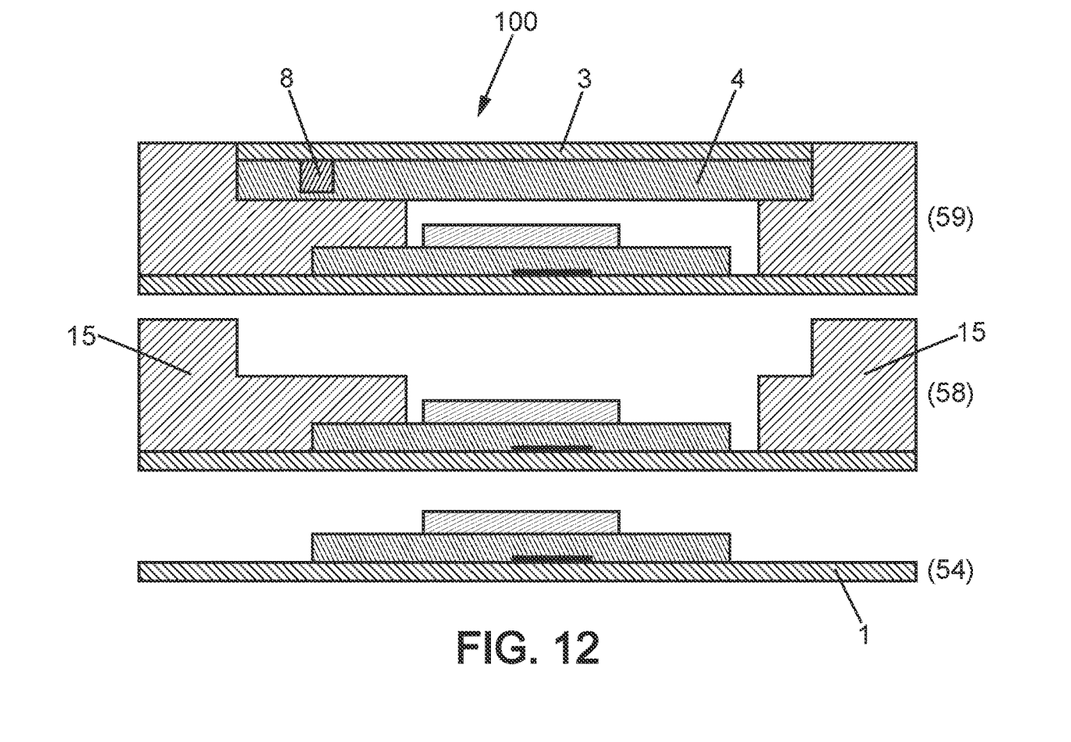
FIG. 12 is a schematic view illustrating yet other steps of the method according to an embodiment of the invention.

FIG. 12 schematically illustrates the rest of the method for manufacturing a display device.

The manufacturing method also includes the steps of:
injecting onto the first layer 1 of the first subassembly a support 15 configured to retain the first layer 1 and second layer 2 (step 58).

The manufacturing method may also include the step of:
securing together the second subassembly and the support 15, the light guide 10 being configured to illuminate the pictogram 6 (step 59).

As schematically represented in FIG. 12, the first subassembly obtained by step 54 in FIG. 10, and the second subassembly obtained by step 57 in FIG. 11, are secured together. The manufacturing method described allows obtaining the display device 100 with a reduced number of operations.

According to an embodiment not shown, the step of injecting onto the first layer 1 of the first subassembly a support 15 configured to retain the first layer 1 and second layer 2 allows simultaneously ensuring that the second subassembly and the support 15 are secured together. Indeed, the support 15 is injected so as to occupy some of the space between the first subassembly and second subassembly. The support 15 thus ensures continuity between the first subassembly and second subassembly. The light guide is configured to illuminate the pictogram 6. In other words, step 58 and step 59 are then combined.

In order to simplify the representation, certain elements of the display device have not been represented, as well as certain intermediate steps. In particular, the steps of establishing the electrical connections of the light source and of the liquid crystal display have not been shown.

The invention claimed is:

1. Display device for a vehicle, comprising:
   a first transparent or translucent layer formed of a plastic film, the first transparent or translucent layer comprising a pictogram, a first surface of the first layer defining an outer surface of the display device,
   a second transparent or translucent layer, covering the pictogram, wherein the second transparent or translucent layer is in contact with the first transparent or translucent layer and integral with the first transparent or translucent layer,
   a liquid crystal display, arranged in line with the pictogram, and
   a light source configured to emit light to illuminate the pictogram by passing through the liquid crystal display and the second layer wherein the pictogram is printed on the first transparent or translucent layer using decorative inks,
   wherein the liquid crystal display at least partially covers the second layer, and
   wherein an assembly formed by the first layer and the second layer is rigid.

2. Display device according to claim 1, wherein the light source is arranged on a rigid third layer, the third layer comprising a printed circuit board, and wherein the light source is arranged next to a light guide arranged on the third layer.

3. Display device according to claim 1, wherein the first layer is configured to supply electric power to the liquid crystal display.

4. A method for producing the display device according to claim 1, comprising the steps of:
   providing a first transparent or translucent layer,
   forming a pictogram on a surface of the first layer,
   injecting onto the first layer a second transparent or translucent layer covering the pictogram, wherein an assembly formed by the first layer and second layer is rigid,
   placing a liquid crystal display on the second layer, arranged in line with the pictogram so as to form a first subassembly
   providing a third layer,
   fixing a light source on the third layer,
   covering the light source with a fourth layer forming a light guide, so as to form a second subassembly,
   injecting onto the first layer of the first subassembly a support configured to retain the first layer and the second layer, and
   securing together the second subassembly and the support, the light guide being configured to illuminate the pictogram.

5. Display device according to claim 1, wherein the light source is arranged on the first layer, the light source being electrically powered by an electrically conductive track arranged on the first layer.

6. Display device according to claim 5, wherein the light source is embedded in a layer of translucent or transparent material.

7. Display device according to claim 1, wherein the light source is arranged on a third layer, the light source being electrically powered by an electrically conductive track arranged on the third layer.

8. Display device according to claim 7, wherein the light source is embedded in a layer of translucent or transparent material.

9. Display device according to claim 7, wherein the light source is embedded in a fourth layer arranged on the third layer.

10. Display device according to claim 7, wherein the light source is arranged on a rigid third layer, the third layer comprising a printed circuit board, and wherein the light source is arranged next to a light guide arranged on the third layer.

11. Display device according to claim 7, wherein the third layer is configured to supply electric power to the liquid crystal display.

12. Display device according to claim 7, wherein the liquid crystal display is connected to a power supply by an electrical connection traversing the third layer.

13. Display device according to claim 7, wherein the liquid crystal display is arranged between the second layer and the third layer.

14. Display device according to claim 13, wherein the light source is embedded in a fourth layer arranged on the third layer.

15. Display device according to claim 13, wherein the light source is arranged on a rigid third layer, the third layer comprising a printed circuit board, and wherein the light source is arranged next to a light guide arranged on the third layer.

16. Display device according to claim 13, wherein the third layer is configured to supply electric power to the liquid crystal display.

17. Display device according to claim 13, wherein the liquid crystal display is connected to a power supply by an electrical connection traversing the third layer.

18. Display device for a vehicle, comprising:
   a first transparent or translucent layer formed of a plastic film, the first transparent or translucent layer comprising a pictogram, a first surface of the first layer defining an outer surface of the display device,
   a second transparent or translucent layer, covering the pictogram, wherein the second transparent or translucent layer is in contact with the first transparent or translucent layer and integral with the first transparent or translucent layer,
   a liquid crystal display, arranged in line with the pictogram, and
   a light source configured to emit light to illuminate the pictogram by passing through the liquid crystal display and the second layer,
   wherein the liquid crystal display at least partially covers the second layer,
   wherein an assembly formed by the first layer and the second layer is rigid,
   and wherein the light source is embedded in a layer of translucent or transparent material.

\* \* \* \* \*